US012255543B2

(12) United States Patent
Valchev

(10) Patent No.: US 12,255,543 B2
(45) Date of Patent: Mar. 18, 2025

(54) LLC RESONANT CONVERTER WITH VARIABLE RESONANT FREQUENCY

(71) Applicant: Microchip Technology Incorporated, Chandler, AZ (US)

(72) Inventor: Boyko Valchev, Wexford (IE)

(73) Assignee: Microchip Technology Incorporated, Chandler, AZ (US)

( * ) Notice: Subject to any disclaimer, the term of this patent is extended or adjusted under 35 U.S.C. 154(b) by 239 days.

(21) Appl. No.: 18/127,703

(22) Filed: Mar. 29, 2023

(65) Prior Publication Data

US 2024/0235419 A1 Jul. 11, 2024

Related U.S. Application Data

(60) Provisional application No. 63/437,191, filed on Jan. 5, 2023.

(51) Int. Cl.
*H02M 1/42* (2007.01)
*H02M 3/00* (2006.01)
*H02M 7/48* (2007.01)
*H02M 7/537* (2006.01)

(52) U.S. Cl.
CPC ......... *H02M 7/4818* (2021.05); *H02M 7/537* (2013.01); *H02M 1/4241* (2013.01); *H02M 3/015* (2021.05)

(58) Field of Classification Search
CPC ........................ H02M 1/4241; H02M 3/015
See application file for complete search history.

(56) References Cited

U.S. PATENT DOCUMENTS

| | | | | |
|---|---|---|---|---|
| 6,621,718 B1 * | 9/2003 | Malik | ............... | H02M 3/33576 363/127 |
| 9,502,987 B1 * | 11/2016 | Feno | ................. | H02M 3/33546 |
| 10,763,756 B2 * | 9/2020 | Mayell | ............. | H02M 3/33592 |
| 2013/0265804 A1 * | 10/2013 | Fu | ..................... | H02M 3/33576 363/17 |
| 2014/0369081 A1 * | 12/2014 | Maniktala | ........... | H02M 3/3376 363/21.02 |
| 2015/0049520 A1 * | 2/2015 | Xu | .................... | H02M 3/33573 363/21.02 |
| 2015/0124487 A1 | 5/2015 | Fu et al. | ......................... | 363/17 |
| 2015/0124489 A1 * | 5/2015 | Dai | ...................... | H02M 3/335 363/17 |
| 2021/0132892 A1 | 5/2021 | Choi | | |
| 2021/0194377 A1 * | 6/2021 | Deng | ..................... | H02J 7/007 |

FOREIGN PATENT DOCUMENTS

| | | | | | |
|---|---|---|---|---|---|
| CN | 112234824 A | * | 1/2021 | ......... | H02M 1/0064 |
| EP | 3065284 A1 | | 9/2016 | ............. | H02M 7/48 |
| JP | 01264562 A | | 10/1989 | ............. | H02M 3/28 |

OTHER PUBLICATIONS

International Search Report and Written Opinion, Application No. PCT/US2023/026389, 13 pages, Oct. 17, 2023.

* cited by examiner

*Primary Examiner* — Gary A Nash
(74) *Attorney, Agent, or Firm* — SLAYDEN GRUBERT BEARD PLLC

(57) ABSTRACT

A resonant converter includes a high-side switch and a low-side switch, both coupled to a common node and driven by a complementary input signal. The common node drives a coupled inductor, the coupled inductor connected in parallel with a variable impedance. The coupled inductor may be coupled in series with a capacitor and a transformer. The variable impedance may be adjusted to modify the resonant frequency of the resonant converter.

18 Claims, 4 Drawing Sheets

LLC RESONANT CONVERTER WITH VARIABLE RESONANT FREQUENCY

PRIORITY

This application claims priority to commonly owned U.S. Patent Application No. 63/437,191 filed Jan. 5, 2023, the entire contents of which are hereby incorporated by reference for all purposes.

FIELD OF THE INVENTION

The present disclosure relates to resonant converters, more specifically to control of an LLC resonant converter.

BACKGROUND

Resonant converters may convert an input signal into a DC voltage. Resonant converters may include switches in a half-bridge or a full-bridge configuration, and a resonant circuit. The resonant circuit may be used to control the resonant frequency in the resonant converter. The output of the resonant circuit may be input to the first winding of a transformer, and a load may be coupled across the second winding of the transformer.

As one of various examples, the resonant circuit may include a tank circuit connected in series with the load. When used in a resonant converter, the resonant circuit may function as a voltage divider between the resonant circuit impedance and the load impedance. Under light-load conditions, the impedance of the load is very large compared to the impedance of the tank circuit, so it becomes difficult to regulate the output, since this requires the frequency to approach infinity as the load approaches zero. Even at nominal loads, wide frequency variation is required to regulate the output.

As one of various examples, a resonant circuit may include a tank circuit coupled in parallel with a load. When used in a resonant converter, the resonant circuit may shunt current or voltage from the load through the parallel tank circuit. A parallel resonator requires large amounts of circulating current. This makes it difficult to apply parallel resonant topologies in applications with high power density or large load variations.

An LLC resonant converter includes a resonant circuit, or tank circuit, of two inductors and one capacitor. The first inductor may be a resonant inductor, and the second inductor may be one winding of a transformer. An LLC resonant circuit resonates at a specific frequency, called the resonant frequency. LLC resonant converters including LLC tank circuits can achieve higher switching frequencies and lower switching losses than configurations with fewer components.

LLC resonant converters can regulate the output over output load variations with a relatively small variation of switching frequency, while maintaining excellent efficiency. It can also achieve zero-voltage switching (ZVS) over the entire operating range.

LLC resonant converters may have a limited input voltage range due to the fixed resonant frequency of the resonant circuit. There is a need for LLC resonant converters with adjustable resonant circuits.

SUMMARY

According to one aspect, an LLC resonant converter with an adjustable impedance may enable an adjustable resonant frequency and may enable voltage regulation over a wide range of input voltages.

According to one aspect, there is provided a resonant converter including a first power switch with a first node coupled to a first phase of a complementary input signal, and a second node coupled to a common node, a second power switch with a first node coupled to a second phase of the complementary input signal, and a second node coupled to the common node, wherein the common node coupled to a resonant circuit, the resonant circuit comprising a resonant inductor with a first coupled inductor winding and a second coupled inductor winding, the first coupled inductor winding coupled between the common node and a first plate of a capacitor and the second coupled inductor winding coupled in parallel with a variable impedance circuit, the variable impedance circuit to adjust the resonant frequency of the resonant circuit, and a transformer with a first transformer winding and a second transformer winding, the first transformer winding coupled between the second plate of the capacitor and a return and the second transformer winding coupled to a load.

According to one aspect, there is provided a method, the method including driving a first node of a first power switch and a first node of a second power switch with a complementary periodic signal, a second node of the first power switch and a second node of the second power switch coupled to a common node, coupling a resonant circuit to the common node, and adjusting the resonant frequency of the resonant circuit by varying the impedance of a variable impedance circuit.

BRIEF DESCRIPTION OF THE DRAWINGS

The figures illustrate example devices and methods for control of LLC resonant converters.

DETAILED DESCRIPTION

Figure 1:
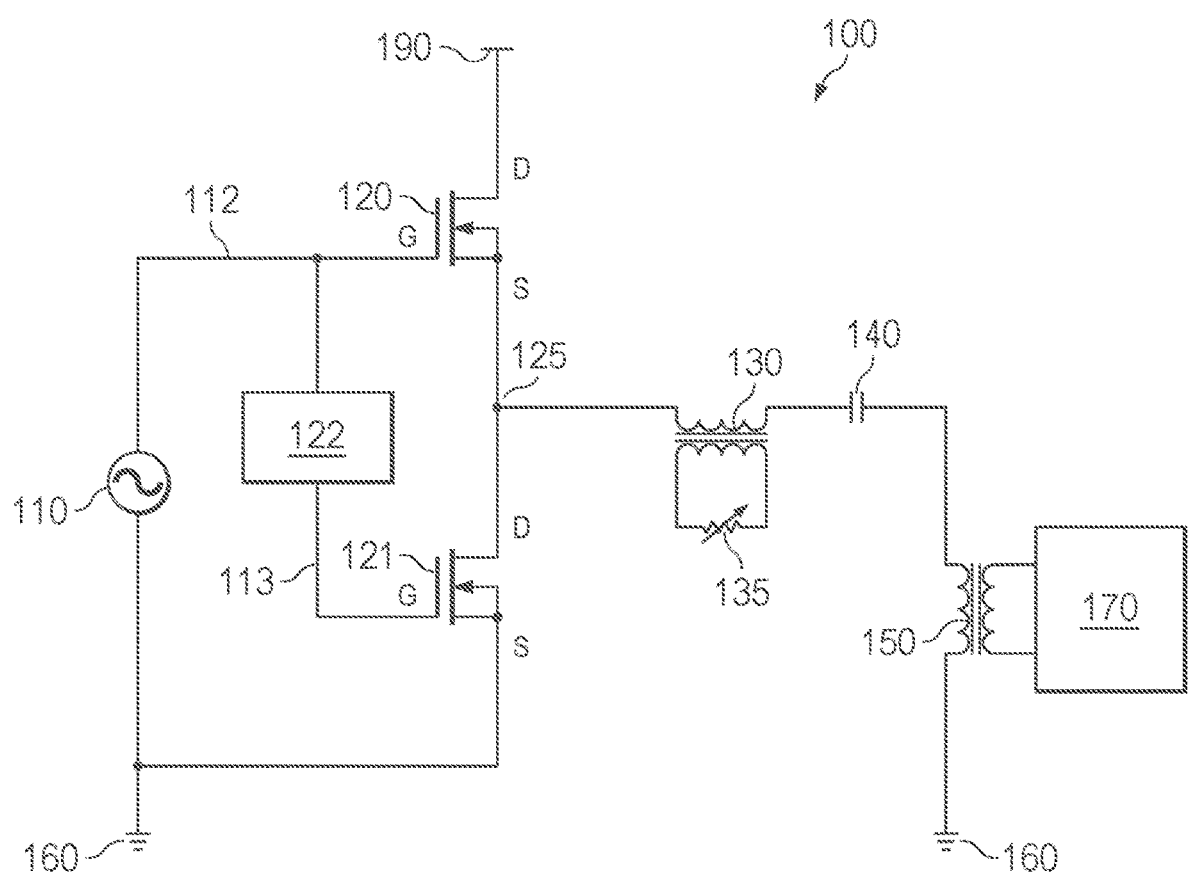
FIG. 1 illustrates an LLC resonant converter according to various examples.

FIG. 1 illustrates one of various examples of an LLC resonant converter 100. A signal source 110 may produce an input signal. Signal source 110 is illustrated as a sinusoidal source, but this is not intended to be limiting. Signal source 110 may produce a square wave input signal, a pulse-width modulated input signal, a triangular wave input signal, or any other periodic input signal. The output of signal source 110 may be input to a phase shift circuit 122. Phase shift circuit 122 may shift the phase of the output of signal source 110. In one of various examples, phase shift circuit 122 may shift the phase of the output of signal source 110 by 180 degrees.

The output of signal source 110 may provide input to the gate of high-side power switch 120. The output of phase shift circuit 122 may provide input to the gate of low-side power switch 121. In this manner, high-side power switch 120 and low-side power switch 121 may be driven with a complementary input signal. High-side power switch 120 may be driven with a first phase of the complementary input signal 112, and low-side power switch 121 may be driven with a second phase of the complementary input signal 113. The complementary input signal may be a square wave input signal, a pulse-width modulated input signal, a triangular wave input signal, or any other periodic input signal. In the example illustrated in FIG. 1, phase shift circuit 122 is illustrated as a discrete component, but in other examples, complementary inputs to high-side power switch 120 and low-side power switch 121 may be provided directly by signal source 120 with the appropriate phase shift, and thus phase shift circuit 122 may not be required, or may be considered incorporated within signal source 110. High-side power switch 120 may be a metal-oxide field effect transistor (MOSFET), or a bipolar transistor or another type of transistor. Low-side power switch 121 may be a metal-oxide field effect transistor (MOSFET), or a bipolar transistor or another type of transistor. High-side power switch 120 may be coupled to high-side power supply 190. Low-side power switch 121 may be coupled to a return, including but not limited to ground node 160. High-side power switch 120 and low-side power switch 121 may be coupled to common node 125. High-side power switch 120 and low-side power switch 121 are illustrated as n-channel transistors, but this is not intended to be limiting. High-side power switch 120 may be a p-channel transistor. Low-side power switch 121 may be a p-channel transistor. High-side power switch 120 and low-side power switch 121 are illustrated as field-effect devices, but this is not intended to be limiting. High-side power switch 120 may be a bipolar device. Low-side power switch 121 may be a bipolar device.

High-side power switch 120 and low-side power switch 121 may be coupled to resonant inductor 130. Resonant inductor 130 may be the first inductor in an LLC resonant converter. Resonant inductor 130 may be coupled in parallel to variable impedance circuit 135.

In operation, the impedance value of variable impedance circuit 135 may be modified to change the resonant frequency of resonant converter 100. Variable impedance circuit 135 is illustrated in FIG. 1 as a variable resistor, but this is not intended to be limiting. Variable impedance circuit 135 may be a variable resistor. Variable impedance circuit 135 may be a variable amplitude direct-current (DC) current source, which may saturate the core of resonant inductor 130 and change the impedance of resonant inductor 130. Variable impedance circuit 135 may be a variable amplitude alternating-current (AC) current source. Variable impedance circuit 135 may be a switch, including but not limited to a MOSFET switch, in series with a resistor.

Resonant inductor 130 may be coupled to a first plate of resonant capacitor 140. A transformer 150 may be coupled to the second plate of resonant capacitor 140. The first winding of transformer 150 may be the second inductor in the LLC resonant converter. A first winding of transformer 150 may be coupled between the second plate of resonant capacitor 140 and a return, including but not limited to ground node 160. A second winding of transformer 150 may be coupled to a load 170. The signal delivered to the load may also be termed the output of the LLC resonant converter 100.

In the example of FIG. 1, changing the impedance of resonant inductor 130 may change the resonant frequency of resonant converter 100. In one of various examples, variable impedance circuit 135 may be a variable resistance. Adjusting the value of the variable resistance may change the resonant point of resonant converter 100. An increase in the variable resistance may increase the inductance. In one of various examples, variable impedance circuit 135 may be a variable amplitude DC current source. Adjusting the amplitude of the variable amplitude DC current source may change the resonant point of the converter, since the amplitude of the variable amplitude DC current source may magnetize the inductor core of resonant inductor 130. In one of various examples, variable impedance circuit 135 may be a variable amplitude AC current source. Adjusting the amplitude of the variable amplitude AC current source may magnetize the core of resonant inductor 130. Magnetization of the core may indirectly decrease the inductance of resonant inductor 130.

Figure 2:
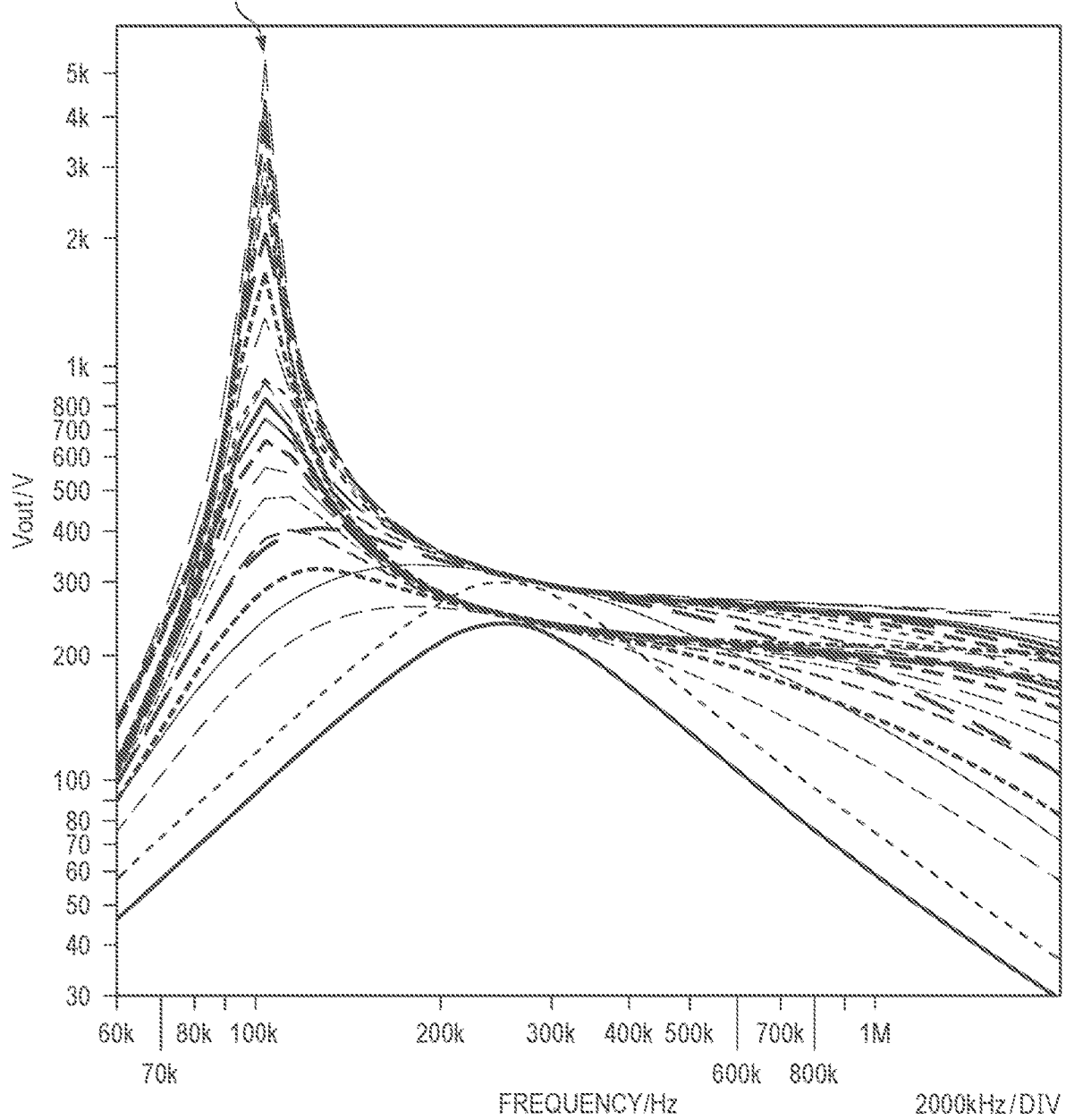
FIG. 2 illustrates an LLC resonant circuit gain response in a first configuration.

FIG. 2 illustrates one of various examples of multiple frequency response plots 200 for an LLC resonant converter in a first configuration. In the first configuration, the inductance value of the resonant inductor may be chosen to achieve a specific output response. The y-axis may represent gain from the input of the resonant circuit to the output, shown by label Vout/V. On this plot are illustrated frequency response plots for multiple load values. Each trace represents a different load value. Output at certain voltages can only be achieved by operating the resonant circuit below its resonant frequency. The resonant frequency is located at the peak of the traces, noted as 210 in FIG. 2. Zero-Voltage Switching (ZVS) mode occurs when high-side power switch 120 and low-side power switch 121 are switched when zero volts are present across the respective switch. Zero-Current Switching (ZCS) mode occurs when high-side power switch 120 and low-side power switch 121 are switched when zero current is passing through the respective switch. When operating below the resonant frequency, the high-side power switch and the low-side power switch may not be operating in a ZVS mode and may introduce high current. This may cause catastrophic failure of the converter.

Figure 3:
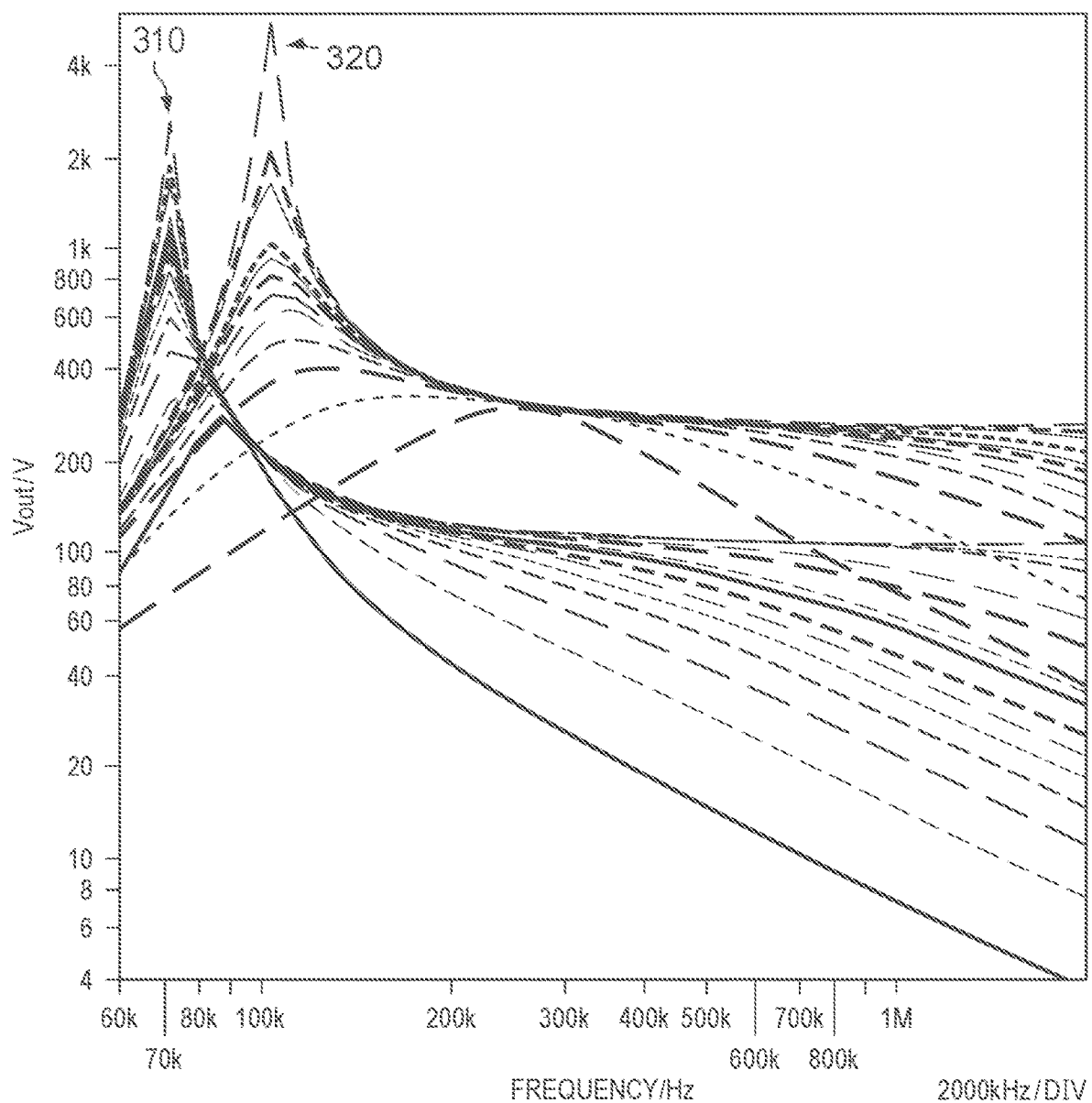
FIG. 3 illustrates an LLC resonant circuit gain response in the first configuration and in a second configuration.

FIG. 3 illustrates one of various examples of multiple frequency response plots 300 for an LLC resonant converter in a first configuration and in a second configuration. The set of traces forming a peak at a frequency nearest to 100 kHz, noted by label 320, illustrates the resonant circuit in the first configuration as illustrated in FIG. 2. The set of traces forming a peak a frequencies nearest to 70 kHz, noted by label 310, illustrates the resonant circuit in a second configuration. In the second configuration, the inductance value of the resonant inductor, may be chosen to achieve a specific output response. The y-axis may represent gain from the input of the resonant circuit to the output shown by label Vout/V. On this plot are illustrated frequency response plots for multiple load values. Each trace represents a different load value. In the example of FIG. 3, the impedance of variable impedance circuit 135 may be modified to change the resonant circuit from the first configuration to the second configuration so as to produce a lower resonant frequency than the resonant frequency illustrated in FIG. 2. The inductance of the resonant inductor may be increased by increasing the impedance of variable impedance circuit 135. The inductance of the resonant inductor may be decreased by decreasing the impedance of variable impedance circuit 135. By increasing the inductance of resonant inductor 130, the resonant frequency may be reduced and the circuit may continue to operate above the resonant frequency in a ZVS mode.

Figure 4:
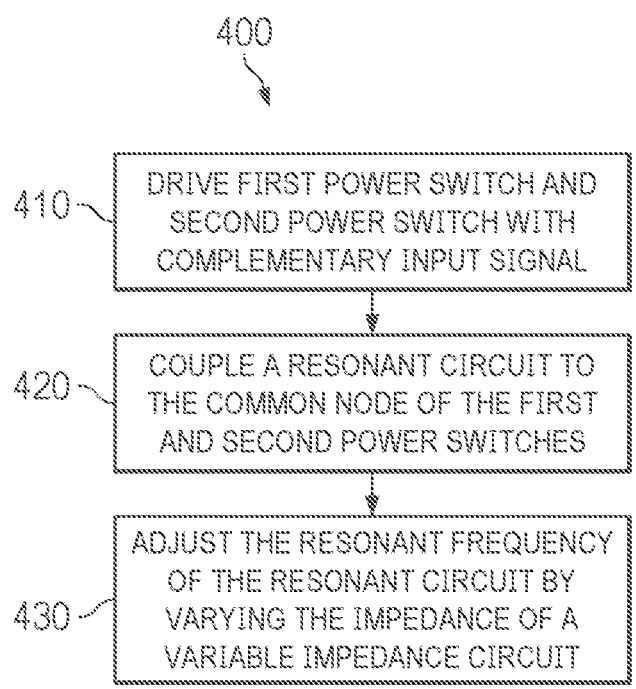
FIG. 4 illustrates a method for controlling the resonant frequency of a resonant converter.

FIG. 4 illustrates one of various examples of a method of for controlling the resonant frequency of a resonant converter. The resonant converter may be an LLC resonant converter as described previously in reference to FIG. 1.

At operation 410, a first power switch and a second power switch may be driven with a complementary input signal. The complementary input signal may be a square wave input signal, a pulse-width modulated input signal, a triangular wave input signal, or any other periodic input signal. The first power switch and the second power switch may be coupled to a common node.

At operation 420, a resonant circuit may be coupled to the common node of the first power switch and the second power switch. The resonant circuit may include a resonant inductor in parallel with a variable impedance circuit. In one of various examples, the variable impedance circuit may be a variable resistance. In one of various examples, the variable impedance circuit may be a variable amplitude DC current source. In one of various examples, the variable impedance circuit may be a variable amplitude AC current source. Adjusting the amplitude of the variable amplitude AC current source may magnetize the core of resonant inductor. Magnetization of the core may indirectly decrease the inductance of resonant inductor.

At operation 430, the resonant frequency of the resonant circuit may be adjusted by varying the impedance of a variable impedance circuit. Adjusting the value of the variable impedance may change the resonant point of resonant converter. Adjusting the amplitude of the variable amplitude DC current source may change the resonant point of the converter, since the amplitude of the variable amplitude DC current source may magnetize the inductor core of resonant inductor. Adjusting the amplitude of the variable amplitude AC current source may magnetize the core of resonant inductor. Magnetization of the core may indirectly decrease the inductance of resonant inductor.

The invention claimed is:

1. A resonant converter comprising:
a first power switch with a first node coupled to a first phase of a complementary input signal, and a second node coupled to a common node;
a second power switch with a first node coupled to a second phase of the complementary input signal, and a second node coupled to the common node;
wherein the common node coupled to a resonant circuit, the resonant circuit comprising:
a resonant inductor with a first coupled inductor winding and a second coupled inductor winding, the first coupled inductor winding coupled between the common node and a first plate of a capacitor and the second coupled inductor winding coupled in parallel with a variable impedance circuit, the variable impedance circuit to adjust the resonant frequency of the resonant circuit, and
a transformer with a first transformer winding and a second transformer winding, the first transformer winding coupled between the second plate of the capacitor and a return and the second transformer winding coupled to a load.

2. The resonant converter as claimed in claim 1, the first power switch comprising a power metal-oxide semiconductor field-effect device (MOSFET) and second power switch comprising a power metal-oxide semiconductor field-effect device (MOSFET).

3. The resonant converter as claimed in claim 1, the first phase and the second phase of the complementary input signal comprising a periodic signal.

4. The resonant converter as claimed in claim 1, the first phase and the second phase of the complementary input signal comprising a pulse-width modulated signal.

5. The resonant converter as claimed in claim 1, the variable impedance circuit comprising a variable resistor.

6. The resonant converter as claimed in claim 5, the variable impedance circuit further comprising at least one switch coupled to the variable resistor.

7. The resonant converter as claimed in claim 1, the variable impedance circuit comprising a variable amplitude direct-current source.

8. The resonant converter as claimed in claim 1, the variable impedance circuit comprising a variable amplitude alternating-current source.

9. A method comprising:
driving a first node of a first power switch and a first node of a second power switch with a complementary periodic signal, a second node of the first power switch and a second node of the second power switch coupled to a common node;
coupling a resonant circuit to the common node, and
adjusting the resonant frequency of the resonant circuit by varying the impedance of a variable impedance circuit.

10. The method as claimed in claim 9, the first power switch comprising a power metal-oxide semiconductor field-effect device (MOSFET) and second power switch comprising a power metal-oxide semiconductor field-effect device (MOSFET).

11. The method as claimed in claim 9, the input signal comprising a pulse-width modulated signal.

12. The method as claimed in claim 9, the variable impedance circuit comprising a variable resistor.

13. The method as claimed in claim 9, the variable impedance circuit comprising a variable amplitude direct-current source.

14. The method as claimed in claim 13, wherein adjusting the resonant frequency by varying the impedance of a variable impedance circuit comprises varying the impedance of the variable impedance circuit based at least on the current in the variable amplitude direct-current source.

15. The method as claimed in claim 9, the variable impedance circuit comprising a variable amplitude alternating-current source.

16. The method as claimed in claim 15, wherein adjusting the resonant frequency by varying the impedance of a variable impedance circuit comprises varying the impedance of the variable impedance circuit based at least on the current in the variable amplitude alternating-current source.

17. The method as claimed in claim 9, the resonant circuit comprising a coupled inductor, a capacitor and a transformer.

18. The method as claimed in claim 15, the coupled inductor comprising a first coupled inductor winding coupled between the common node and a first plate of the capacitor and a second coupled inductor winding coupled in parallel with the variable impedance circuit.

* * * * *